Aug. 19, 1969   F. M. DARR ET AL   3,462,205
NEEDLE-ROLLER BEARING

Filed Sept. 28, 1967   2 Sheets-Sheet 1

INVENTORS
FRANK M. DARR
CHESTER A. GRONSKI

INVENTORS
FRANK M. DARR
CHESTER A. GRONSKI

United States Patent Office 3,462,205
Patented Aug. 19, 1969

3,462,205
NEEDLE-ROLLER BEARING
Frank M. Darr, Houston, Tex., and Chester A. Gronski, Newington, Conn., assignors, by mesne assignments, to Textron, Inc., Providence, R.I., a corporation of Delaware
Filed Sept. 28, 1967, Ser. No. 671,303
Int. Cl. F16c 33/34, 33/78; F16o 1/24
U.S. Cl. 308—212
12 Claims

ABSTRACT OF THE DISCLOSURE

The invention provides a needle-roller bearing assembly in which the needle rollers are caged for retention and in which self-contained thrust-bearing elements are provided solely to sustain thrust loads of the needle rollers and cage when the assembly is subjected to an axial force field.

---

Our invention relates to an improved needle-roller bearing construction, having specific utility in the presence of a force field having a substantial component along the bearing axis.

Although needle-roller bearings are designed for sustaining essentially pure radial loads, and although they have been combined with thrust bearings in order to sustain any axial load components, a problem is encountered when these bearings are subjected to a force field having a substantial component along the bearing axis. Such fields may be due to magnetic action, to acceleration, or other causes. For example, in the case of the bearing which supports a propeller blade in its hub, a needle-roller bearing may be relied on for purposes of facilitating changes in blade pitch, but the strong centrifugal-force field due to propeller rotation will subject internal parts of the needle bearing to unnecessary friction every time the blade pitch is changed. For example, in the case of a bearing having caged needle rollers, this means strong axial contact of the cage with the end flange of the bearing, with attendant drag torque. And this occurs regardless of the merits of the thrust bearing relied upon to sustain the axial load to which the hub is subjected, by reason of the spinning propeller blade.

It is accordingly an object to provide an improved needle-roller bearing construction capable of avoiding the above-noted difficulty in a force-field situation.

It is a specific object to meet the foregoing object with a structure capable of substantially reducing adverse axial-force effects within a needle-roller bearing.

Another specific object is to provide a needle-roller bearing with its own internal thrust-bearing structure so that the needle rollers can be relied upon to sustain essentially pure radial load, with substantially reduced friction due to axial forces on the rollers.

Still another specific object is to provide sealing and shock-cushioning features in a bearing of the character indicated.

Figure 1:
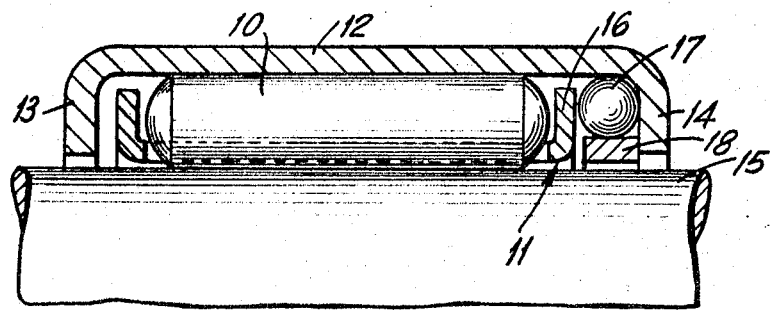

Other objects and various further features of novelty and invention will be pointed out or will occur to those skilled in the art from a reading of the following specification in conjunction with the accompanying drawing. In said drawing, which shows, for illustrative purposes only, preferred forms of the invention:

FIG. 1 is an enlarged fragmentary longitudinal sectional view of a needle-roller bearing of the invention; and FIGS. 2 to 8 are similar views showing modifications.

Briefly stated, the invention contemplates application to a needle-roller bearing in which the rollers are retained in angularly spaced relation by a cage, or constitute a full complement without a cage, the rollers being in turn positioned between end flanges of an outer race member. Thrust-bearing means of the invention is provided within such structure for the essential purpose of relieving the cage or the free rollers from frictional contact with an end flange, thus substantially reducing the chance of friction development due to roller and cage rotation, in the presence of a strong force field (e.g. unidirectional centrifugal force along the bearing axis) in the direction driving the rollers and cage toward that end flange.

Referring to FIG. 1 of the drawings, the invention is shown in application to a needle-roller bearing comprising a unit-handling assembly of plural needle rollers 10, held in angularly spaced relation by a longitudinally slotted cage or retainer 11 (of conventional construction), and within an outer-race ring, sleeve or shell 12. Integral radially inward end flanges 13–14 provide axial retention of the bearing parts. The bearing unit is used by securing the shell 12 in a suitable mount, such as a bore in a propeller hub (not shown), and by inserting a journal or shaft 15 (such as the formed end of a propeller blade) into the bore defined within the caged rollers 10.

In the event that the described bearing is subjected to a force field with a substantial left-to-right component along the axis of shaft 15, the cage flange 16 will be driven into axial abutment with shell flange 14, reflecting action of the force field on the rollers 10 and cage 11. Such abutment gives rise to strong frictional resistance to bearing rotation, causing undesired wear, heat development, and possible cage (and therefore roller) misalignment.

In accordance with the invention, antifriction thrust-bearing means contained within shell 12 and axially between flanges 16–14 materially relieves this frictional situation. In FIG. 1, a plurality of spaced balls 17, of diameter less than that of rollers 10, is provided in an axial clearance between flanges 16–14. If the balls 17 are of diameter only slightly less than that of the rollers 10, then no special additional provision need be made for radial positioning of the balls 17, and provision of a "full complement" of balls 17 obviates need for a ball separator; in the form shown, however, balls 17 are of considerably less diameter than rollers 10, and in that event, we prefer to assure that balls 17 run in a consistent orbit, by providing a loose ring 18 within the complement circle of balls 17. Ring 18 has a bore in clearance relation with shaft 15, an axial length less than the diameter of balls 17, and an outer diameter to radially clear balls 17 when the balls contact the bore of sleeve 12.

Under centrifugal or other force-field action (e.g. unidirectional, left-to-right), the caged roller assembly will be driven to the right in the sense of FIG. 1, causing thrust to be sustained by balls 17 between flanges 16–14. This results in substantially reduced drag torque on cage 11, with attendant smoother operation for extended life.

Figure 2:
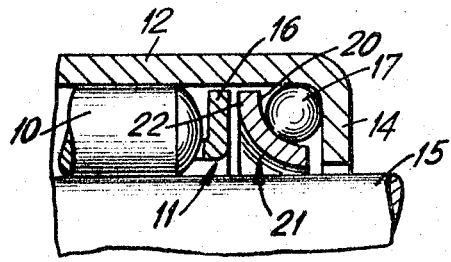

In the modification of FIG. 2, an additional function is achieved by providing a concave ball-race surface 20 on the ring member 21 which radially locates the ball complement. Ring 21 may be spun, stamped or drawn to enable an angular-contact relation with balls 17, which are preferably provided as a full complement. Thrust is taken upon contact of cage flange 16 with the radial-flange portion 22 of ring 21, and the angular-contact of race 21 with balls 17 establishes thrust reaction axially at flange 14 and radially in the sleeve bore.

Figure 3:
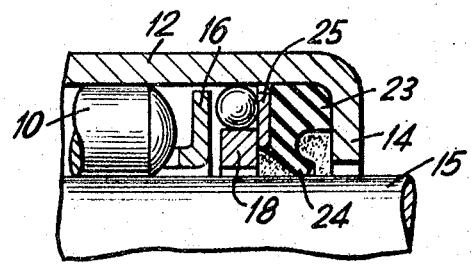

The arrangement of FIG. 3 is generally similar to FIG. 1 except that a resilient washer 23 is interposed in the chain of internal thrust-sustaining parts. Washer 23, which may be of elastomeric material, such as Neoprene, rubber or the like, is supported within the corner at which flange 14 joins the race body sleeve 12, and it is shown formed integrally with an angularly flared flexible lip or seal flange 24 for lightly-stressed wiping and sealing engagement with shaft 15. A radial thrust race for balls 17 is provided by a hard annular metal plate 25, which may be bonded to resilient washer 23 when the latter is molded to the described shape.

Figure 4:
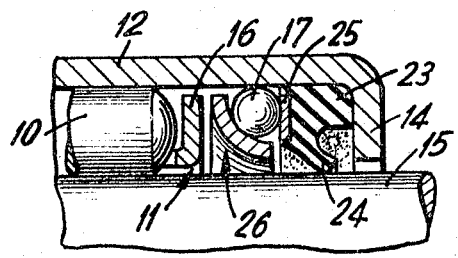

The arrangement of FIG. 4 is our preferred embodiment, and incorporates into a sealed bearing, of the FIG. 3 variety, a cusped thrust-race element 26 as described at 21 in FIG. 2. In this embodiment, the resilient washer 23 axially spaces the radial-thrust race surface 25 sufficiently from flange 14 to assure radial contact of balls 17 at the cylindrical bore of sleeve 12, remote from any local aberrations in the cylindrical race which may be occasioned by proximity to flange 14.

Figure 5:
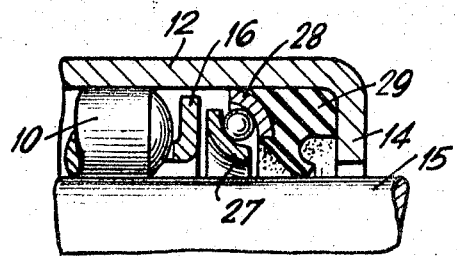
Figure 6:
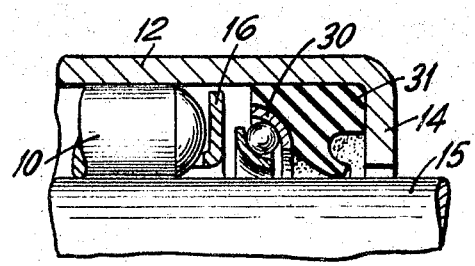
Figure 7:
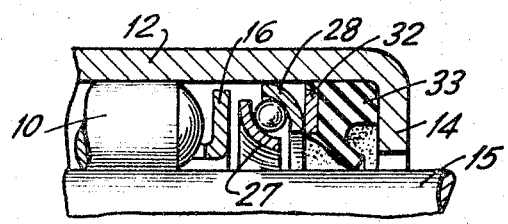

The embodiments of FIGS. 5, 6 and 7 are generally similar in the sense that they all employ specially formed angular-contact race elements for the thrust-bearing balls 17. The inner of these race elements 27 is as already described at 21 and 26 in FIGS. 2 and 4. The outer of these race elements 28 is oppositely dished. In FIG. 5, the outer thrust-race element 28 is molded into resilient spacer 29 such that the bore of sleeve 12 provides radial location. In FIG. 6, both the axially and radially flanged edges of a similar race element 30 are given full-floating resilient support in resilient spacer 31, and in FIG. 7 the thrust-bearing races 27–28 of FIG. 5 are separately assembled, relying on axial abutment of race element 28 with plate 32 in spacer 33, the latter then resembling what has been described at 23–25 in FIG. 3.

Figure 8:
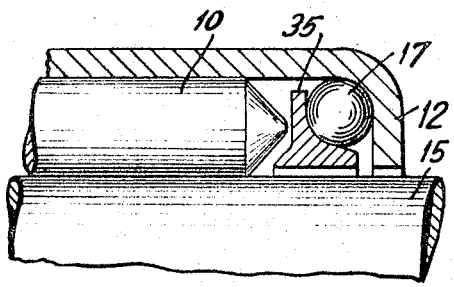

The embodiment of the invention illustrated in FIG. 8 differs from those previously described in that the needle bearings 10 are not set within a cage, but constitute a full complement freely disposed about the shaft 15. In this embodiment annular race member 35 is positioned between the rolling elements 10 and the ball elements 17. Member 35 constitutes the inner race for the ball elements 17, provides an end thrust plate for the roller elements 10, and acts to retain both roller and ball elements in place.

It will be seen that we have provided an improved needle-bearing construction with means for assuring that essentially purely radial loads will be sustained by the bearing, regardless of acceleration or other force fields acting on internal parts of the bearing. This result is achieved with relatively little added complexity or cost, and longer bearing life is attained.

What is claimed is:

1. A needle-roller bearing, comprising an outer-race sleeve having a cylindrical race bore and an integral radially inward flange at one axial end, a plurality of elongated needle rollers within the race bore for riding the same, retainer cage means holding said rollers in angularly spaced relation adjacent the race bore and including at one axial end a generally radially directed flange in clearance relation with the race bore, and a plurality of antifriction thrust-sustaining elements axially interposed between said retainer flange and said sleeve flange, said antifriction thrust-sustaining elements being of lesser radial extent than that represented by the diameter of said needle rollers.

2. The needle-roller bearing of claim 1, in which said thrust-sustaining elements are balls of a diameter less than the needle-roller diameter.

3. The needle-roller bearing of claim 2, in which the needle-roller diameter substantially exceeds the ball diameter, and a positioning ring radially intermediate the inner and outer limits of the path of roller movement, the balls being loosely radially positioned by said ring.

4. The needle-roller bearing of claim 2, in which said balls are provided as a substantially full complement.

5. The needle-roller bearing of claim 2, in which the needle-roller diameter substantially exceeds the ball diameter, and positioning ring radially intermediate the inner and outer limits of the path of roller movement, the balls being loosely radially positioned by said ring, said ring being formed with a circumferentially extending concave angular-contact thrust-sustaining ball-race surface, and said ring having a radial-flange portion positioned to receiving axial abutment with said retainer flange.

6. A needle-roller bearing, comprising an outer-race sleeve having a cylindrical race bore and an integral radially inward flange at one axial end, a plurality of elongated needle rollers with the race bore for riding the same, retainer-cage means holding said rollers in angularly spaced relation adjacent the race bore and including at one axial end a generally radially directed flange in clearance relation with the race bore, a plurality of thrust-sustaining ball elements axially interposed between said retainer flange and said sleeve flange, said ball elements being of a diameter less than the needle-roller diameter, an elastomeric washer seated in the sleeve bore and against said sleeve flange, and a member having a thrust-receiving ball-race surface interposed between said balls and said washer.

7. The needle-roller bearing of claim 6, in which said elastomeric washer is bonded to said ball-race member.

8. The needle-roller bearing of claim 6, in which said elastomeric washer includes a reinforcing metal plate extending radially at the inner axial end of said washer, in axial-abutment relation with said ball-race member.

9. The needle-roller bearing of claim 6, in which said ball-race member is formed with a circumferentially continuous concaved raceway for angular-contact ball engagement.

10. The needle-roller bearing of claim 6, in which said washer includes an integral generally radially inwardly directed seal flange of inner diameter less than the diameter of the surface on which said needle-rollers are positioned to ride, whereby, upon assembly of said bearing to a shaft, said seal flange will be axially flexed into resilient sealing engagement with the shaft.

11. The needle-roller bearing of claim 7, in which said ball-race member is formed with a circumferentially continuous concave raceway for angular-contact ball engagement, said ball-race member being bonded to said elastomeric washer in radial-clearance relation with the sleeve bore.

12. The needle-roller bearing of claim 2, in which a thrust-sustaining circumferentially continuous ball-race member includes a radial abutment surface interposed between said balls and the adjacent retainer cage flange.

References Cited

UNITED STATES PATENTS

| 1,687,755 | 10/1928 | Foley | 308—206 |
| 3,168,359 | 2/1965 | Murphy | 308—174 |

MARTIN P. SCHWADRON, Primary Examiner

FRANK SUSKO, Assistant Examiner

U.S. Cl. X.R.

308—187.2